United States Patent [19]
Stewart et al.

[11] Patent Number: 5,923,460
[45] Date of Patent: Jul. 13, 1999

[54] MECHANISM FOR EXTENDING INSTANTANEOUS RF FREQUENCY COVERAGE FOR AN ACOUSTO-OPTIC COHERENT CHANNEL RECEIVER (AOCCR) VIA BANDWIDTH DILATION

[75] Inventors: Jennifer K. Stewart, Melbourne; Randall K. Morse; Norman C. Hollingsworth, both of Palm Bay; Mitchell E. Percival, Melbourne, all of Fla.

[73] Assignee: Harris Corporation, Melbourne, Fla.

[21] Appl. No.: 09/081,304

[22] Filed: May 19, 1998

[51] Int. Cl.$^6$ ........................................ G02F 1/33
[52] U.S. Cl. ..................... 359/305; 359/306; 359/162; 359/285; 359/618
[58] Field of Search ..................... 359/305, 306, 359/307, 308, 285, 287, 298, 312, 162, 559, 618; 364/822

[56] References Cited

U.S. PATENT DOCUMENTS

| | | | |
|---|---|---|---|
| 4,448,494 | 5/1984 | Freyre | 359/285 |
| 4,460,250 | 7/1984 | Freyre | 359/287 |
| 4,670,854 | 6/1987 | Mossberg et al. | 364/822 |
| 4,696,061 | 9/1987 | Labrum | 359/162 |
| 4,976,520 | 12/1990 | Brandstetter et al. | 359/285 |
| 5,121,248 | 6/1992 | Mohon et al. | 359/306 |
| 5,281,907 | 1/1994 | Hartup et al. | 359/305 |
| 5,629,911 | 5/1997 | Sasaki | 369/44.42 |

Primary Examiner—Loha Ben
Attorney, Agent, or Firm—Charles E. Wands

[57] ABSTRACT

In order to increase the available signal processing bandwidth of an acousto-optic coherent channelizer, the optical beam spot-shaping and projection components of the channelizer are configured to project M reference beam spots upon each photodetector of the channelizer's photodetector array. The parameters of the reference Bragg cell, reference signal R(t), and Fourier optics components are such that they project M reference beam spots upon each photodetector of the channelizer's photodetector array, where M is the desired system bandwidth multiplication factor. No change to the configuration of the photodetector array or its associated post-detection signal processing electronics is required.

3 Claims, 2 Drawing Sheets

5,923,460

MECHANISM FOR EXTENDING INSTANTANEOUS RF FREQUENCY COVERAGE FOR AN ACOUSTO-OPTIC COHERENT CHANNEL RECEIVER (AOCCR) VIA BANDWIDTH DILATION

FIELD OF THE INVENTION

The present invention relates in general to optical signal processing systems, and is particularly directed to increasing the available signal processing bandwidth of an acousto-optic coherent channelized receiver (channelizer), by configuring the optical beam spot-shaping and projection components of the channelizer to project M reference beam spots upon each photodetector of the channelizer's photodetector array, without changing the photodetector array or its associated post-detection signal processing electronics.

BACKGROUND OF THE INVENTION

Coherent acousto-optic channelizers are employed in signal processing applications, where the signal of interest is typically a pulsed or continuous wave radar signal having a frequency on the order of several or more GHz. For this purpose, as shown diagrammatically in FIG. 1, the general signal processing architecture of such a channelizer includes an input port 11 to which the input signal S(t) of interest is coupled.

As a non-limiting example, the input port 11 may be coupled to the analog signal output of a passive radar receiver (including radar antenna and associated low noise amplifier (LNA) units, not shown), which receives RF signals falling in a 1–5 GHz range.

The RF signal S(t), containing P unknown frequency components, at input port 11 is applied to a transducer 21 of a 'signal' acousto-optic modulator or Bragg cell 20, disposed in a 'signal' leg or path portion 31 of a collimated coherent light beam derived from beam (spot)-shaping optics 29 and a coherent optical beam generator (laser) 30. The beam spot-shaping optics 29 in the signal leg 31 serves to adjust the incoming beam to the size required to generate the desired optical channel shape. As the RF input signal is applied to the signal path Bragg cell, the resulting acoustic wave launched through that cell modulates and filters the signal path beam 31 to produce P deflected output beams. The deflection of each beam is proportional to the corresponding frequency component.

At the same time, a reference signal R(t), containing Q equally spaced known frequency components in the bandwidth of interest (e.g., 500 MHz), is applied to a transducer 41 of a 'reference' Bragg cell 40, disposed in a 'reference' leg or path portion 33 of the output beam from the laser 30. (To reduce the complexity of the illustration, only the center frequency beam is shown. In actuality there are Q diffracted beams exiting the reference Bragg cell 40, with the diffraction angle(s) being determined by the corresponding reference signal frequencies.)

As the reference signal R(t) modulates and filters the reference beam 33, it produces Q deflected output beams, each of which is deflected by an amount proportional to its corresponding frequency. A reference beam and a signal beam interfere when a deflected beam in the signal path lies in the same optical path as a deflected beam in the reference path.

Via a downstream beam splitter-combiner 23, the deflected output beams of the signal Bragg cell 20 sum or interfere with any corresponding deflected output beams of the reference Bragg cell 40. These beams are then focused via (Fourier) beam-projection optics 50, which typically comprise a set of lenses, so that, as diagrammatically illustrated in FIG. 2, a summed reference beam and a signal beam pair will be confined within the light receiving or sensitivity area of the respective photodetector 62 of a photodetector array 60. If there is no signal beam present to interfere with a given reference beam, the projection optics will confine only the corresponding reference beam within the light receiving or sensitivity area, i.e., unit 61, of the respective photodetector of photodetector array 60.

The combined beams are deflected to a location on the photodetector array 60 in accordance with the frequency content of the acousto-optically processed light beam and the Fourier optics 50, so that the respective detectors of the photodetector array 60 will be associated with successively adjacent bins or channels, each corresponding to a prescribed spectral portion of the overall system bandwidth. Namely, for a given RF system bandwidth BW and an array of N photodetectors, the imaging optics 50 and associated reference Bragg cell 40 with reference signal R(t) containing Q frequency components will be configured to place one reference beam spot on each of the N successively adjacent channels or bins, each of which has an individual bandwidth of BW/N Hz at a spatial resolution of Q spots per N photodetectors (or one spot per photodetector). As a non-limiting example, for an RF input signal bandwidth of 500 MHz (e.g., from 750 MHz to 1.25 GHz), an array of twenty-five photodetectors may be employed to subdivide the RF signal into twenty-five successively adjacent frequency bins, each having a bandwidth of 20 MHz, wherein the (IF) contents of a respective channel or bin are a coherent representation of the RF input signal.

Since the photodetector array and its associated post-detection signal processing electronics are relatively high cost components, that are often of modular configuration so that they may be housed within a constrained packaging platform, increasing the channelizer's signal processing bandwidth by some factor M, for example by a factor of two or more, can not only entail a considerable expense of adding more photodetector arrays and/or associated array output processing circuitry, but may not be practical or even possible from a hardware standpoint.

SUMMARY OF THE INVENTION

In accordance with the present invention, the cost and hardware penalty associated with increasing the operational bandwidth of an acousto-optic coherent channelizer is effectively obviated by configuring the beam spot-shaping and projection optics components of the channelizer to increase the spot resolution to more than one reference beam spot per photodetector. In particular, the parameters of the beam spot-shaping and projection optics components are such that they project M reference beam spots upon each photodetector of the channelizer's photodetector array (where M is the desired bandwidth multiplication factor). No change to the configuration of the photodetector array or its associated post-detection signal processing electronics is required.

Since the channelizer's beam spot-shaping and projection optics unit is comprised of a relatively simple set of lenses to define spot size, dilating the instantaneous bandwidth of the channelizer is a relatively simple matter of changing out the beam spot-shaping and projection components. For the above example of a photodetector array module containing twenty-five photodetectors, a modification of the parameters of the beam spot-shaping and projection optics to form two spots per photodetector allows twice the original system bandwidth to be processed, via fifty adjacent frequency bins (of 20 MHz per bin), contained on twenty-five adjacent photodetectros (of 40 MHZ per photodetector), thereby doubling the RF bandwidth processing capability of the example from 500 MHz to 1 GHz.

DETAILED DESCRIPTION

Figure 1:
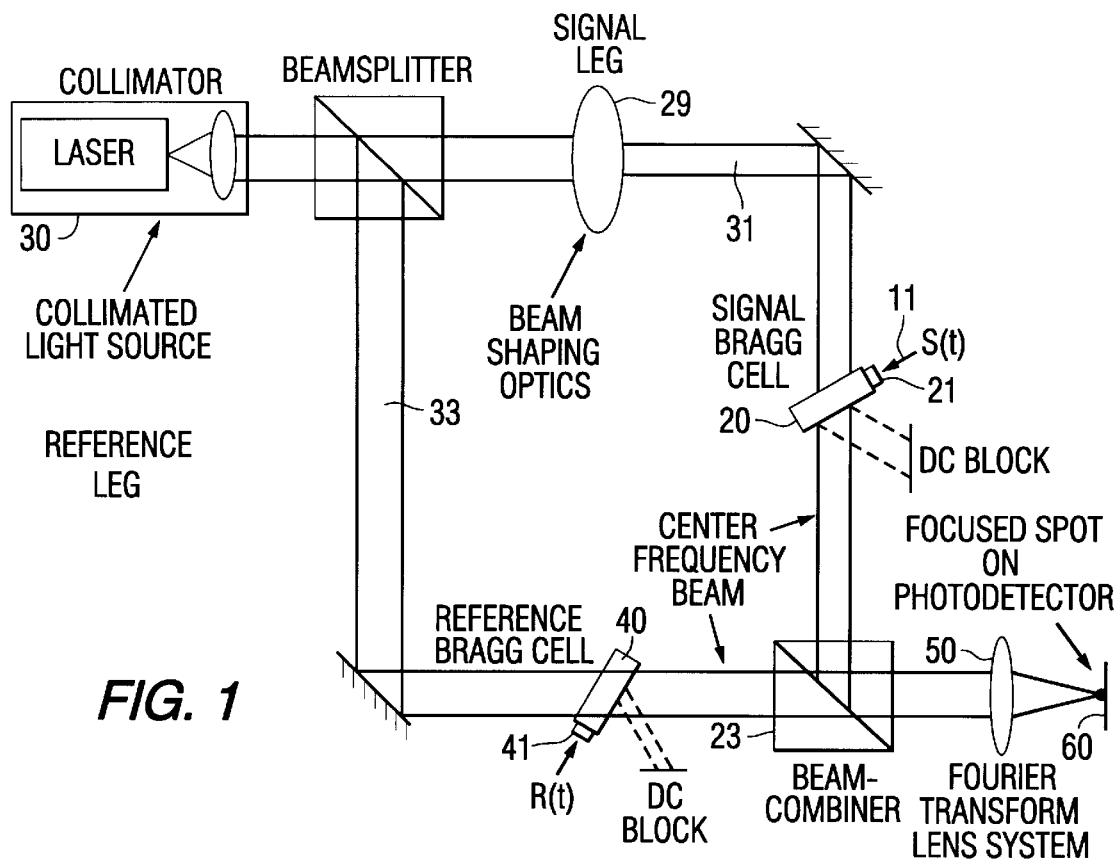
FIG. 1 shows an acousto-optic Bragg cell-based channelizer that is used to diagrammatically illustrate the architecture of both a conventional channelizer, described above, and a modification thereof to realize the bandwidth dilation channelizer of the present invention.

Before describing in detail the new and improved acousto-optic channelizer of the present invention, it should be observed that the invention resides primarily in what is effectively a prescribed arrangement of conventional communication circuits and associated electro-optic, optoelectronic and digital signal processing components. Consequently, the configuration of such circuits and components and the manner in which they interface with other elements of a communication system, such as but not limited to a passive radar receiver, have, for the most part, been illustrated in the drawings by readily understandable block diagrams. These block diagrams show only those specific details that are pertinent to the present invention, so as not to obscure the disclosure with details which will be readily apparent to those skilled in the art having the benefit of the description herein. Thus, the block diagram illustration to be described is primarily intended to show the major components of the system in a convenient functional grouping, whereby the present invention may be more readily understood.

Figure 2:
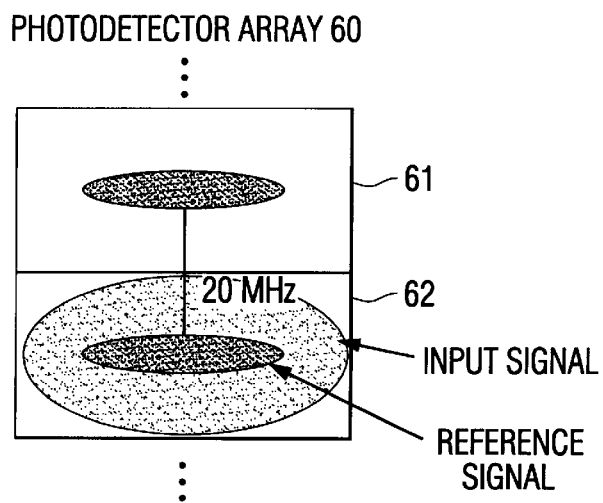
FIG. 2 diagrammatically illustrates the manner in which a reference beam of the acousto-optic Bragg cell-based channelizer of FIG. 1 is focussed by the channelizer's beam spot-shaping and projection optics to form a single spot within the light sensitivity area of a respective photodetector of the channelizer's photodetector array.
Figure 3:
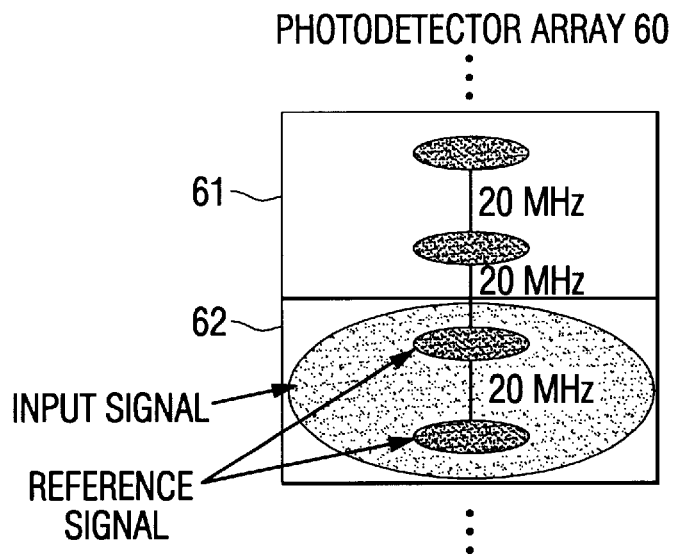
FIG. 3 diagrammatically illustrates a beam spot pattern as formed on a respective photodetector by the beam spot-shaping and projection optics employed in the channelizer of FIG. 1, when M=2.
Figure 4:
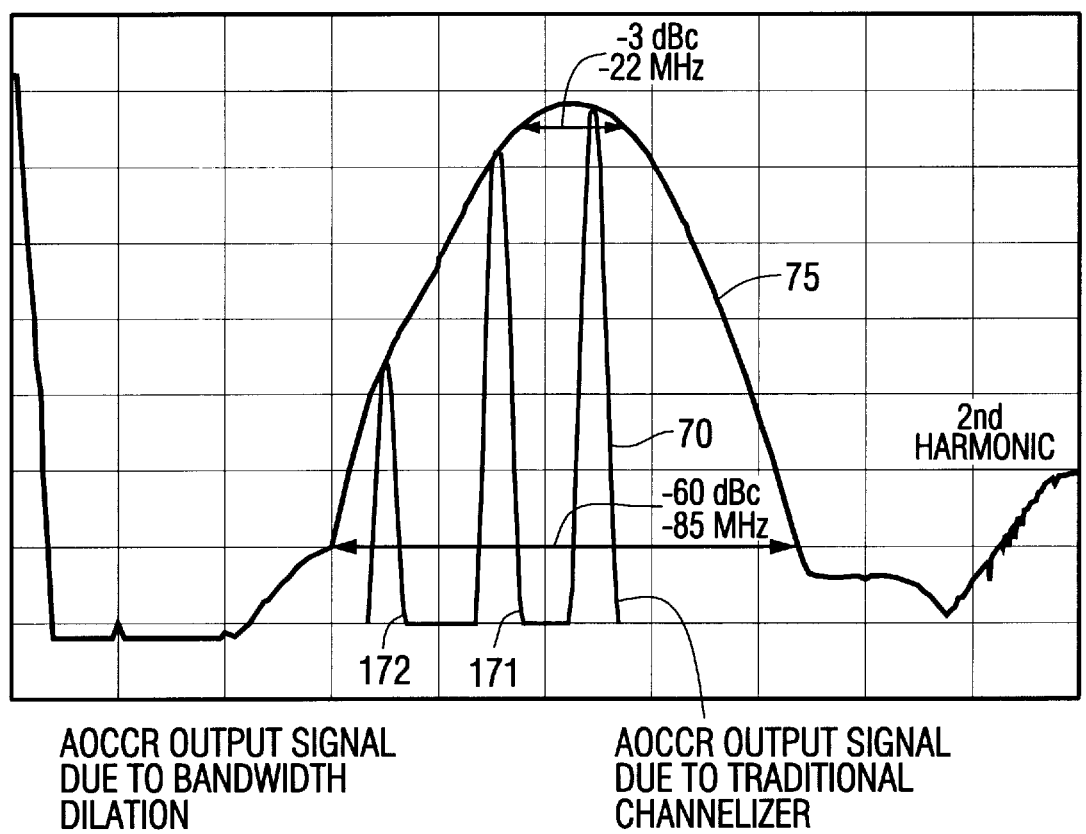
FIG. 4 diagrammatically illustrates a comparison of the bandwidth dilation obtained with the channelizer of the present invention, as represented by a pair of spectral lines 171 and 172 in FIG. 4 and the performance of a prior art channelizer, as represented by a signal spectral line 70, as the input signal S(t) sweeps across the bandwidth of a single photodetector under test, forming the overall signal envelope 75.

As described briefly above, the present invention modifies components of the channelizer architecture FIG. 1 to realize a bandwidth dilation channelizer. For this purpose, the Fourier optics 50, reference signal R(t) and, as necessary, the Bragg cells 20 and 40 are modified, so that the overall projection optics units 50, 20 and 40 are operative to project a multiplicity M of reference beam spots upon each photodetector of the channelizer's photodetector array 60, as diagrammatically illustrated in FIG. 3 (where M=2), rather than only a single reference spot (as shown in FIG. 2) for the conventional channelizer. As described briefly above, the increase in the number of reference beam spots per photodetector 62 corresponds to a desired system bandwidth multiplication factor M.

Since the channelizer's beam spot-shaping and projection optics unit customarily comprises a relatively simple set of lenses to define spot size, implementation of the bandwidth dilation channelizer of the present invention is a relatively simple matter of changing the parameters of the replacement optics 20, 29, 40 and 50 employed in FIG. 1.

For the above example of an array of twenty-five photodetectors, a modification of the parameters of the beam spot-shaping and projection optics to increase the spot resolution to M=2 spots per photodetector will allow an RF signal of twice the original bandwidth to be processed, via fifty adjacent frequency bins (of 20 MHz per bin and 40 MHz per photodetector), doubling the RF bandwidth processing capability from 500 MHz to 1 GHz. It should be noted that the bandwidth dilation improvement provided in accordance with the present invention is not limited to this or any other expansion value. The value of M=2 has only been given as a non-limiting illustrative example.

While we have shown and described an embodiment in accordance with the present invention, it is to be understood that the same is not limited thereto but is susceptible to numerous changes and modifications as known to a person skilled in the art, and we therefore do not wish to be limited to the details shown and described herein, but intend to cover all such changes and modifications as are obvious to one of ordinary skill in the art.

What is claimed:

1. For use with an acousto-optic coherent channelizer comprising an optical beam director, which is operative to direct a first portion of an optical beam from an optical beam generator along a signal optical beam path containing beam spot-shaping optics and a signal acousto-optic beam deflector to which an unknown signal is applied, and a second portion of said optical beam along a reference optical beam path containing a reference acousto-optic beam deflector, to which a reference signal R(t) containing Q known equally spaced frequency components within a system bandwidth, and a beam combiner and projector which is operative to combine said first (signal) and second (reference) portions of said optical beam into an output beam and to project said output beam onto a photodetector of a photodetector array containing a plurality of N photodetectors which occupy a spatial dimension defined by a first prescribed bandwidth, a method of increasing the effective operational bandwidth of said channelizer comprising the steps of:

(a) increasing the bandwidth of said reference signal to a multiple M of first prescribed bandwidth; and (b) configuring said reference acousto-optic beam deflector, said reference signal R(t), and Fourier optics disposed downstream from said beam combiner and projector so as to cause M spots of a reference beam to be projected upon each of the N photodetectors of said photodetector array.

2. An acousto-optic coherent channelizer comprising:

an optical beam director, which is operative to direct a first portion of an optical beam from an optical beam generator along a signal optical beam path containing beam spot-shaping optics and a signal acousto-optic beam deflector to which an unknown signal is applied, and a second portion of said optical beam along a reference optical beam path containing a reference acousto-optic beam deflector to which a reference signal R(t) containing Q known, equally spaced frequency components within a system bandwidth is applied; and a beam combiner and projector which is operative to combine said first (signal) and second (reference) portions of said optical beam into output beams and to project said output beams onto a photodetector array containing a plurality of N photodetectors, each photodetector having a size sufficient to accommodate a plurality of M spots of a prescribed spot size, and wherein said reference acousto-optic beam deflector, said reference signal R(t), and Fourier optics disposed downstream from said beam combiner and projector are operative to form MXN=Q output reference beam spots on said photodetector array.

3. An acousto-optic coherent channelizer according to claim 2, wherein said acousto-optic beam deflectors comprise Bragg cells.

* * * * *